(12) United States Patent
Aso et al.

(10) Patent No.: US 9,973,060 B2
(45) Date of Patent: May 15, 2018

(54) MOTOR, PUMP, AND METHOD FOR MANUFACTURING MOTOR

(71) Applicants: Hiroki Aso, Tokyo (JP); Mamoru Kawakubo, Tokyo (JP); Mineo Yamamoto, Tokyo (JP); Hiroyuki Ishii, Tokyo (JP); Junichiro Oya, Tokyo (JP); Yuto Urabe, Tokyo (JP)

(72) Inventors: Hiroki Aso, Tokyo (JP); Mamoru Kawakubo, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 268 days.

(21) Appl. No.: 14/652,997

(22) PCT Filed: Dec. 28, 2012

(86) PCT No.: PCT/JP2012/084189
§ 371 (c)(1),
(2) Date: Jun. 17, 2015

(87) PCT Pub. No.: WO2014/103056
PCT Pub. Date: Jul. 3, 2014

(65) Prior Publication Data
US 2015/0340929 A1    Nov. 26, 2015

(51) Int. Cl.
*H02K 9/06*    (2006.01)
*H02K 9/14*    (2006.01)
(Continued)

(52) U.S. Cl.
CPC .............. *H02K 9/06* (2013.01); *F04D 19/002* (2013.01); *F04D 25/06* (2013.01); *F04D 29/40* (2013.01);
(Continued)

(58) Field of Classification Search
CPC ..... F04D 29/703; F04D 29/5806; H02K 9/06; H02K 9/14; H02K 5/225; H02K 11/33
(Continued)

(56) References Cited

U.S. PATENT DOCUMENTS 1,959,608 A * 5/1934 Ansingh .................. H02K 9/08
                                                                                310/57
5,377,036 A * 12/1994 Appel .................. G02B 5/3016
                                                                                349/1
(Continued)

FOREIGN PATENT DOCUMENTS

JP    S56-017874 U    7/1979
JP    S63-57317 U     4/1988
(Continued)

OTHER PUBLICATIONS

International Search Report of the International Searching Authority dated Apr. 9, 2013 for the corresponding international application No. PCT/JP2012/084189 (and English translation).

*Primary Examiner* — Peter J Bertheaud
(74) *Attorney, Agent, or Firm* — Posz Law Group, PLC (57) ABSTRACT

The motor includes a molded stator; a cooling fan that is assembled to an end part of a shaft projecting from one end face of the molded stator; a fan cover that covers the cooling fan; a capacitor assembly box that is provided on the molded stator; and a foot plate that is provided on the molded stator. On an end face of the molded stator in an axial direction, a plurality of holes, each protruding from the end face, are formed; and a plurality of projections, each formed in
(Continued)

positions opposite to a hole and press-fitted into its respective hole, are formed in the fan cover.

8 Claims, 11 Drawing Sheets

(51) Int. Cl.
| | | |
|---|---|---|
| *H02K 5/22* | (2006.01) | |
| *F04D 29/58* | (2006.01) | |
| *F04D 29/70* | (2006.01) | |
| *F04D 19/00* | (2006.01) | |
| *F04D 25/06* | (2006.01) | |
| *F04D 29/40* | (2006.01) | |
| *F04D 29/64* | (2006.01) | |
| *H02K 15/02* | (2006.01) | |
| *H02K 11/00* | (2016.01) | |
| *H02K 5/15* | (2006.01) | |
| *F04D 29/62* | (2006.01) | |
| *H02K 3/50* | (2006.01) | |
| *H02K 5/00* | (2006.01) | |
| *H02K 11/25* | (2016.01) | |

(52) U.S. Cl.
CPC ....... *F04D 29/5806* (2013.01); *F04D 29/626* (2013.01); *F04D 29/646* (2013.01); *F04D 29/703* (2013.01); *H02K 3/50* (2013.01); *H02K 5/00* (2013.01); *H02K 5/15* (2013.01); *H02K 5/225* (2013.01); *H02K 9/14* (2013.01); *H02K 11/0094* (2013.01); *H02K 11/25* (2016.01); *H02K 15/02* (2013.01); *Y10T 29/49014* (2015.01)

(58) Field of Classification Search
USPC ............... 417/368, 423.9; 310/62, 63, 89
See application file for complete search history.

(56) References Cited

U.S. PATENT DOCUMENTS

| | | | | |
|---|---|---|---|---|
| 6,916,149 | B2* | 7/2005 | Liou ................... | F04D 29/584 |
| | | | | 415/175 |
| 7,362,017 | B2* | 4/2008 | Piper .................. | H02K 11/33 |
| | | | | 310/63 |
| 7,541,701 | B2* | 6/2009 | Lin ..................... | H02K 11/33 |
| | | | | 310/58 |
| 7,923,875 | B2* | 4/2011 | Henry ................. | H02K 5/225 |
| | | | | 310/64 |
| 7,999,423 | B2* | 8/2011 | Asou .................. | H02K 5/20 |
| | | | | 310/43 |
| 8,004,125 | B2* | 8/2011 | Asou .................. | H02K 5/20 |
| | | | | 310/43 |
| 9,181,958 | B1* | 11/2015 | Kopel ................. | F04B 39/066 |
| 2005/0220637 | A1* | 10/2005 | Kopel ................. | F04B 39/066 |
| | | | | 417/372 |
| 2010/0148596 | A1 | 6/2010 | Asou et al. | |
| 2010/0320848 | A1 | 12/2010 | Asou et al. | |
| 2015/0236561 | A1* | 8/2015 | Aso .................... | H02K 5/22 |
| | | | | 310/43 |

FOREIGN PATENT DOCUMENTS

| | | |
|---|---|---|
| JP | H04-051061 U | 4/1992 |
| JP | H05-300699 A | 11/1993 |
| JP | H07-298543 A | 11/1995 |
| JP | H09-088895 A | 3/1997 |
| JP | H09-215284 A | 8/1997 |
| JP | 2591115 Y2 | 12/1998 |
| JP | 2001-275301 A | 10/2001 |
| JP | 2005-536970 A | 12/2005 |
| JP | 2007-082362 A | 3/2007 |
| JP | 2009-027863 A | 2/2009 |
| JP | 2012-019617 A | 1/2012 |
| WO | 2008/136061 A1 | 11/2008 |

\* cited by examiner

MOTOR, PUMP, AND METHOD FOR MANUFACTURING MOTOR

CROSS REFERENCE TO RELATED APPLICATION

This application is a U.S. national stage application of International Patent Application No. PCT/JP2012/084189 filed on Dec. 28, 2012, the disclosure of which is incorporated herein by reference.

TECHNICAL FIELD

The present invention relates to a motor, a pump, and a method for manufacturing a motor.

BACKGROUND

A conventional motor includes a cylindrical rotor; a stator on which windings wound around a stator core surrounding the rotor are hardened with a resin insulation material and formed to be cylindrical; a bearing housing provided in an inner periphery part of the resin insulation material on one end of the stator; a bearing bracket engaging with one end face of the stator; a rotation shaft supported by bearings respectively provided at the bearing housing and at the bearing bracket; an external fan provided at an end part of a rotation shaft projecting from the other end face of the stator; and a fan cover that surrounds the external fan and blows cooling air generated by the operation of the external fan towards an outer periphery part of the stator (for example, see Patent Literature 1 listed below).

In the conventional motor, when manufactured by mold-forming with a thermoset resin, the stator is made such that the outer periphery of the resin insulation material is formed to be collinear with the outer periphery of the stator core. Subsequently, on the outer periphery of the stator, a plurality of stays are provided radially such that these stays are elongated in an axial direction, and these stays are integrally formed with the resin insulation material. The fan cover is attached on an outer periphery of the stays.

PATENT LITERATURE

Patent Literature 1: Japanese Patent Application Laid-open No. H5-300699

For example, when a motor is to be incorporated in a domestic pump, a component (a foot plate) for fixing the motor to a tank is provided. However, in the conventional motor described in Patent Literature 1 listed above, it is necessary to assemble a fan cover, a capacitor assembly box, and a foot plate to a molded stator separately. For example, in order to assemble the fan cover to the molded stator, it is necessary to provide a separate component for assembling the fan cover to the molded stator, and thus there has been a problem in that the known art cannot meet the need to achieve further cost reduction.

SUMMARY

The present invention has been achieved to solve the above problem, and an objective of the present invention is to provide a motor, a pump, and a method for manufacturing a motor that are capable of achieving further cost reduction.

To solve the problem and achieve the objective mentioned above, the present invention relates to a motor that includes: a molded stator including a rotor therein and a stator formed by molding with a thermoset resin; a cooling fan assembled to an end part of a rotor shaft projecting from one end face of the molded stator; a fan cover covering the cooling fan; a capacitor assembly box provided on the molded stator and incorporates a capacitor therein; a foot plate provided on the molded stator; and a bracket provided on the other side of the molded stator. A fixing structure is provided, at a part that opposes an end face of the molded stator in an axial direction and opposes the fan cover, that includes a plurality of holes and a plurality of insertion members, the insertion members to be inserted into the holes and that fixes the fan cover to the molded stator.

According to the present invention, because a fan cover is directly attached to an end part of the molded stator in an axial direction, it is not necessary to provide a separate component for assembling the fan cover to the molded stator; therefore, further cost reduction can be achieved.

DETAILED DESCRIPTION

Exemplary embodiments of a motor, a pump, and a method for manufacturing a motor according to the present invention will be explained below in detail with reference to the accompanying drawings. The present invention is not limited to the embodiments.

First Embodiment

Figure 1:
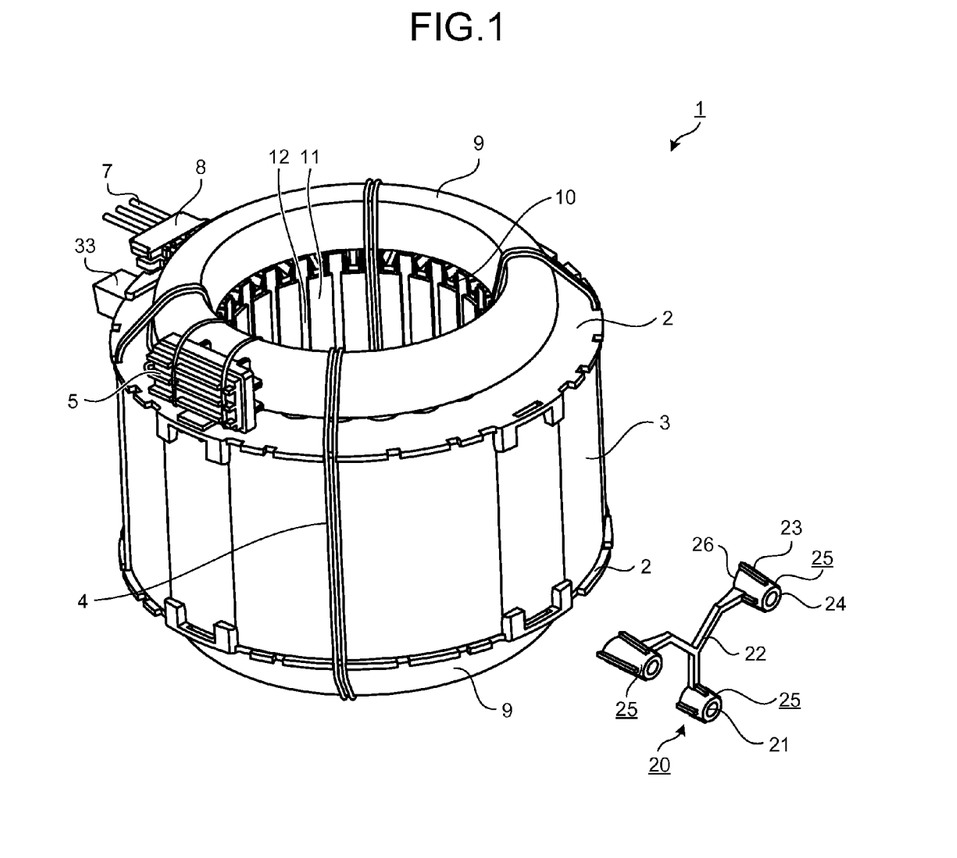
FIG. 1 is a perspective view illustrating a stator according to a first embodiment of the present invention.
Figure 2:
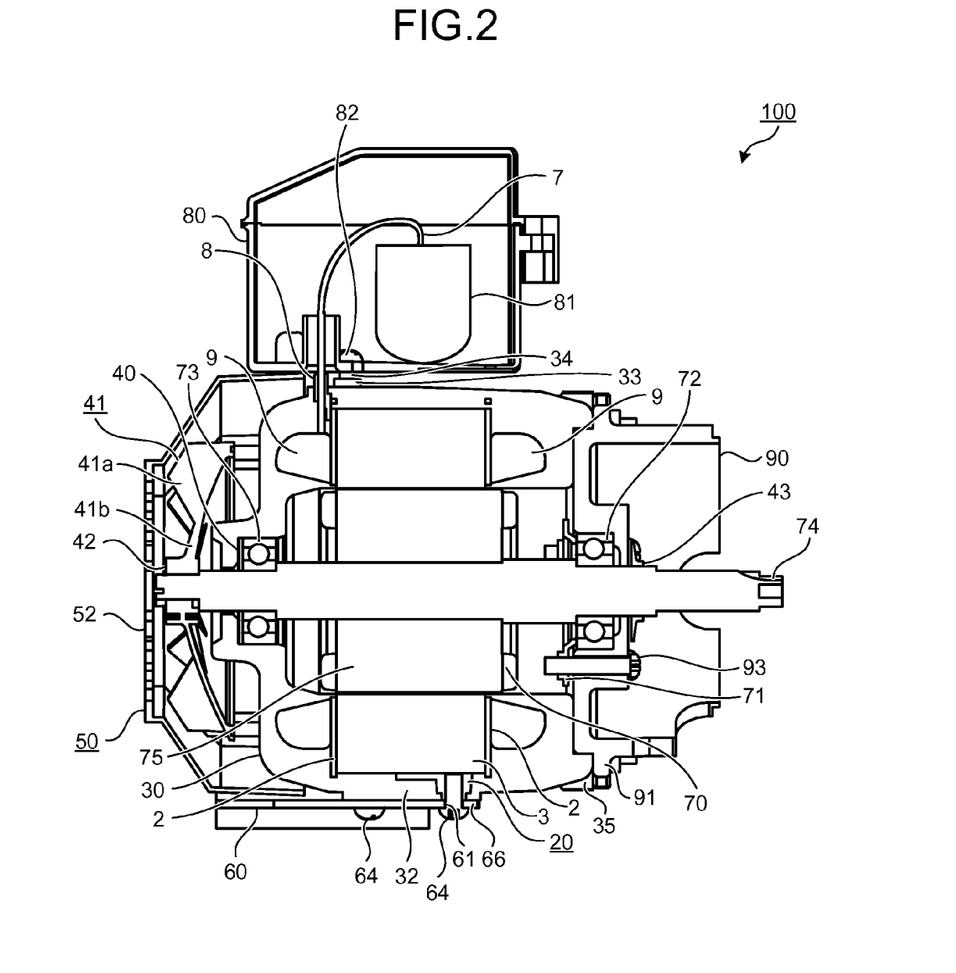
FIG. 2 is a cross-sectional view illustrating a motor according to the first embodiment of the present invention.
Figure 3:
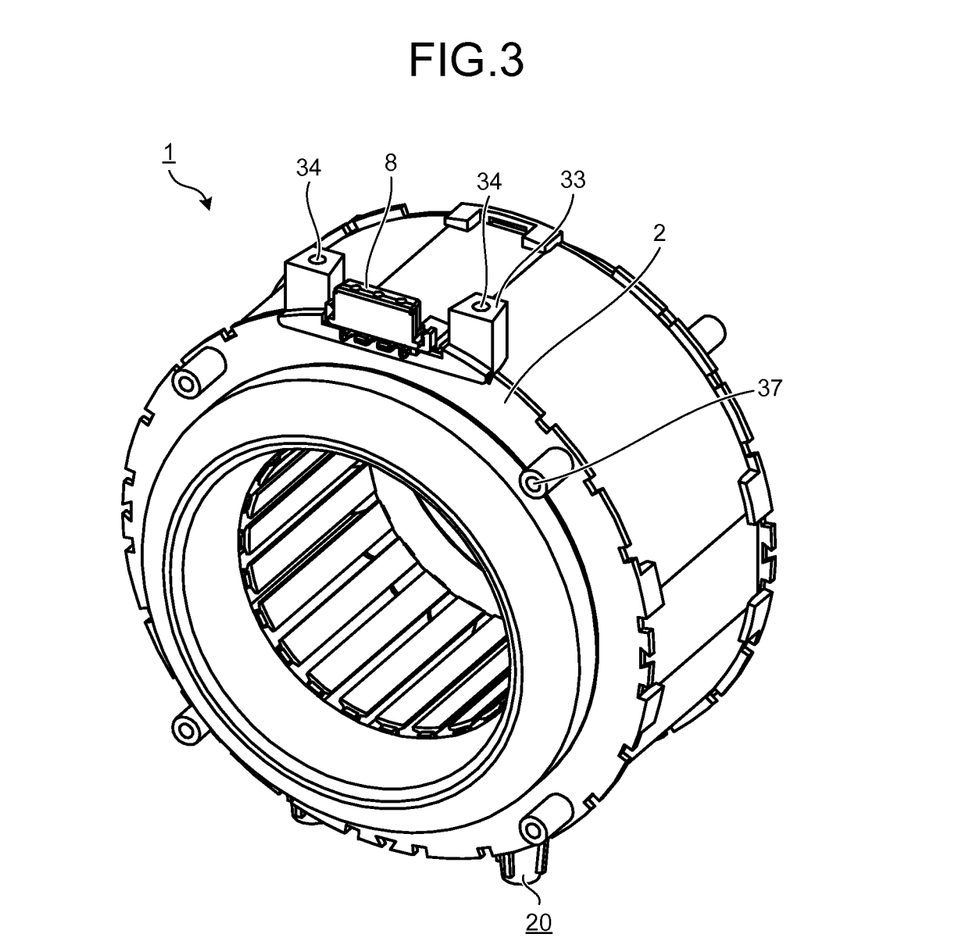
FIG. 3 is a perspective view illustrating the stator as viewed from a side of a lead-wire outlet part.
Figure 4:
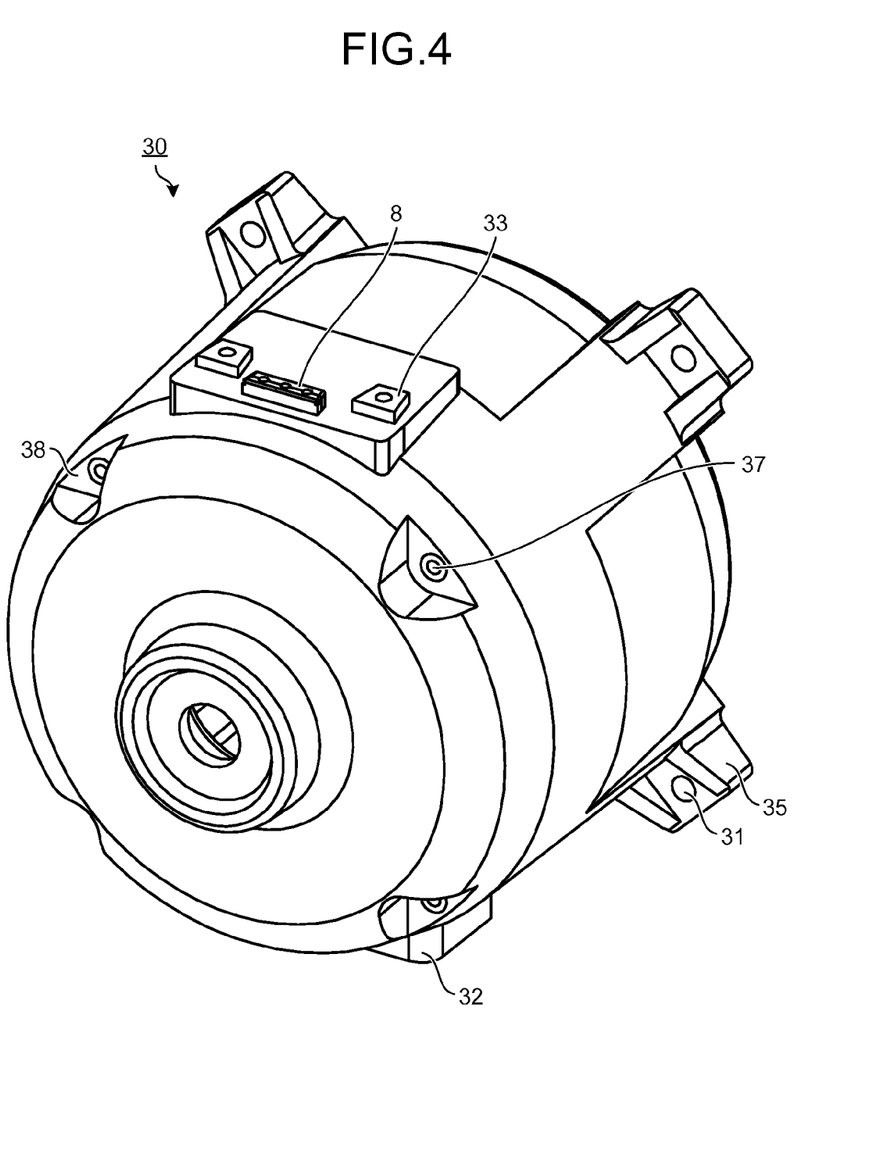
FIG. 4 is a perspective view illustrating a molded stator according to the first embodiment of the present invention.
Figure 5:
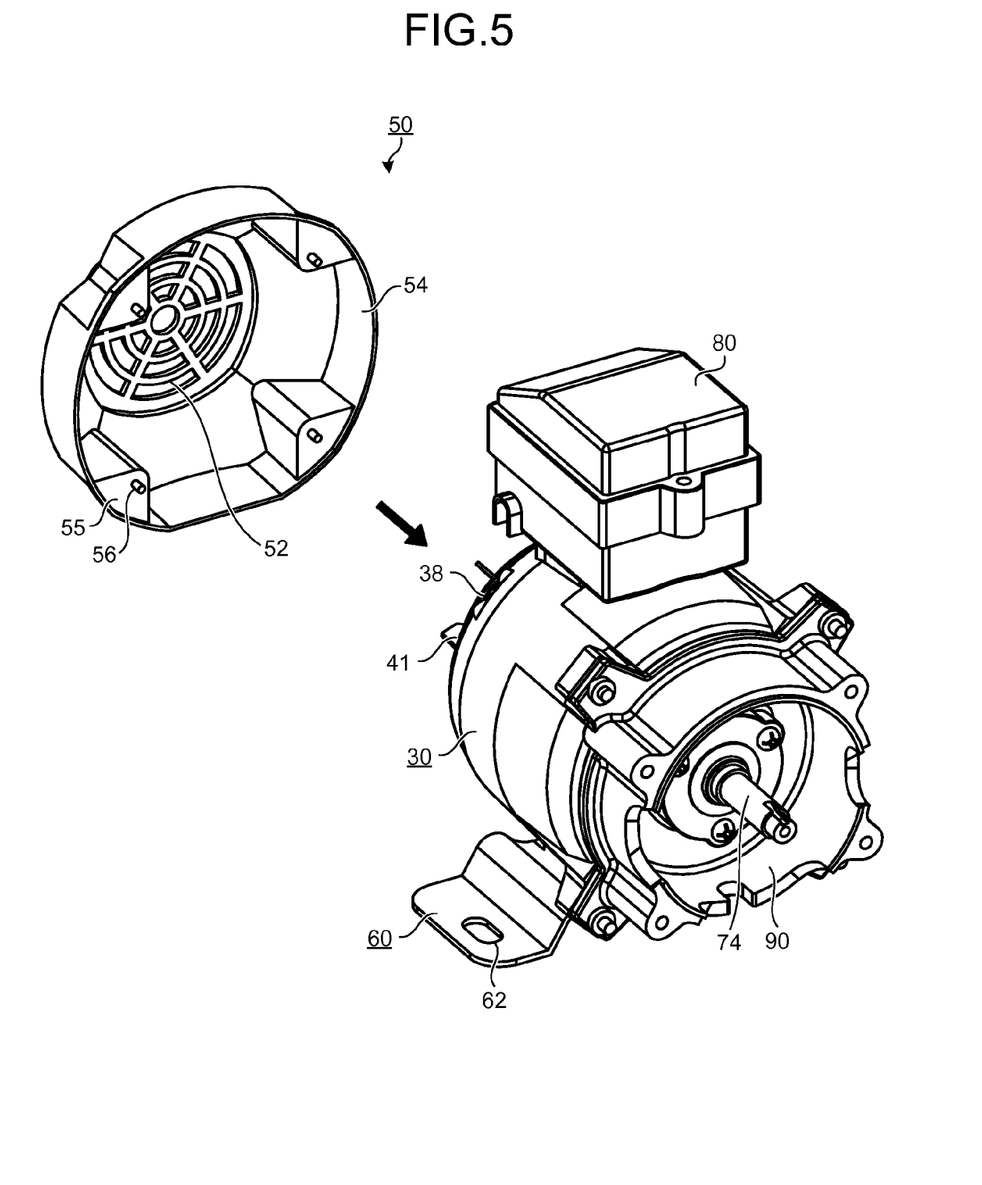
FIG. 5 is a diagram illustrating a state where a fan cover is to be attached to the molded stator.
Figure 6:
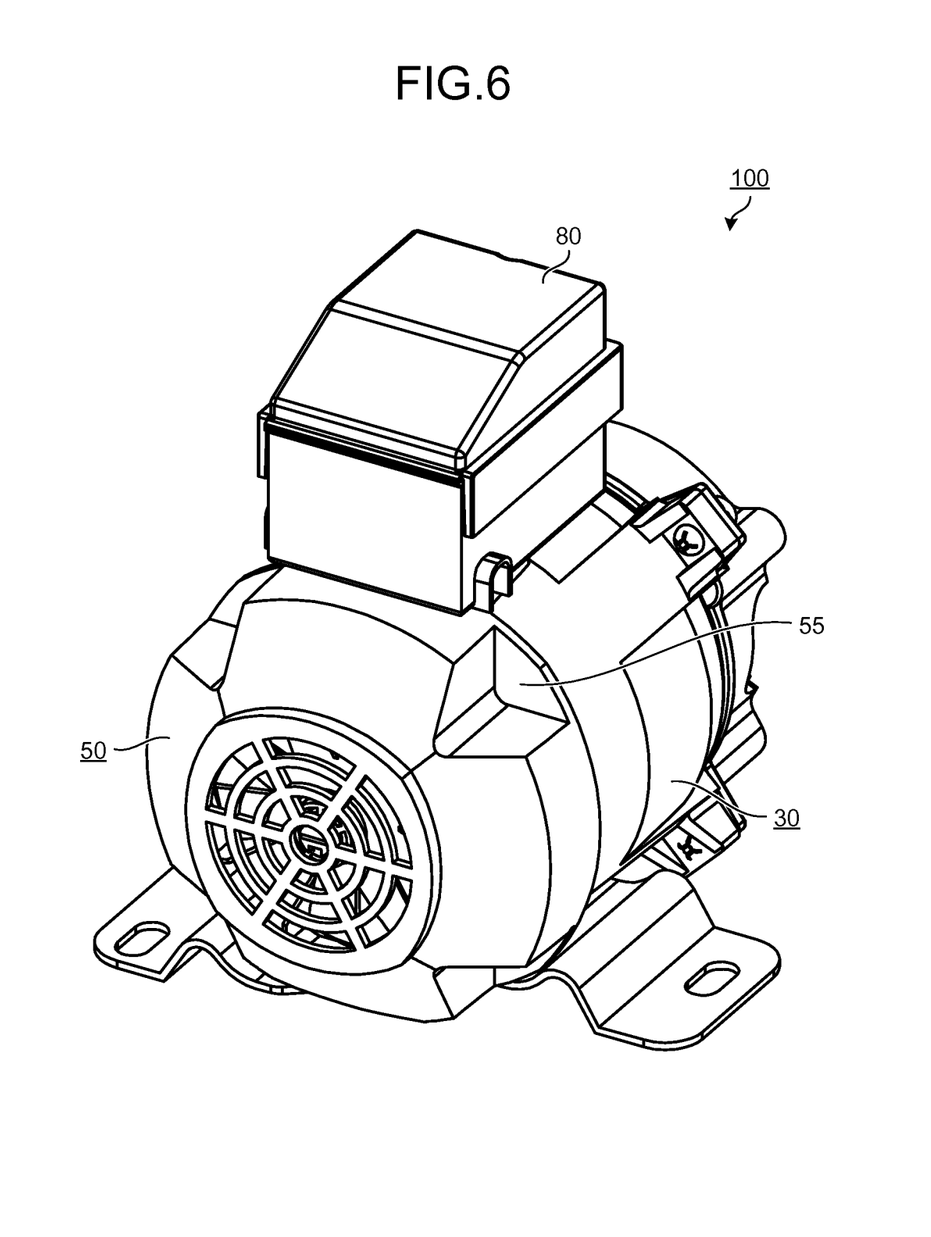
FIG. 6 is a diagram illustrating a motor having the fan cover attached thereto.

FIG. 1 is a perspective view illustrating a stator according to a first embodiment of the present invention, FIG. 2 is a cross-sectional view illustrating a motor according to the first embodiment of the present invention, FIG. 3 is a perspective view illustrating the stator as viewed from a side of a lead-wire outlet part, FIG. 4 is a perspective view illustrating a molded stator according to the first embodiment of the present invention, FIG. 5 is a diagram illustrating a state where a fan cover is to be attached to the molded stator, and FIG. 6 is a diagram illustrating a motor with the fan cover attached thereto.

As illustrated in FIG. 2, a motor 100 is configured to include, as its main constituent elements, a molded stator 30, a cooling fan 41, a fan cover 50, a foot plate 60, a rotor assembly 70, a bracket 90, a capacitor assembly box 80, and a capacitor 81.

A stator 1 illustrated in FIG. 1 is used as a single-phase induction motor, for example, and the present embodiment describes an example where the stator 1 is used as a single-phase induction motor. A stator core 3 is formed by punching through magnetic steel sheets having a plate thickness of approximately 0.35 to 0.50 millimeters, and laminating these sheets by swaging, welding, or the like. End-face insulating plates 2 formed by molding a thermoplastic resin such as PBT (polybutylene terephthalate) are assembled to both end faces of the stator core 3 in an axial direction. The end-face insulating plate 2 has a flat-plate annular shape, and it is formed such that the outer diameter thereof is slightly larger than the outer diameter of the stator core 3, and the inner diameter thereof is slightly larger than the inner diameter of each of the slots (portions accommodating coils therein, not illustrated in FIG. 1) of the stator core 3. Notches (not illustrated) having substantially the same shape as that of the slots are formed on the inner diameter sides of the end-face insulating plates 2.

As illustrated in FIG. 3, a plurality of cylindrical bodies (holes 37) for fixing a fan-cover are formed on an end face (a face of the stator 1 in an axial direction) of the end-face insulating plate 2. As illustrated in FIG. 4, when the stator 1 is formed by mold-forming, these holes 37 protrude from the surface of a fan-cover fixing part 38 in the axial direction of the molded stator 30.

Slot cells (not illustrated) are inserted into the slots of the stator core 3 as insulating members that ensure insulation between adjacent slots, wedges 10, and coils (not illustrated). In a single-phase induction motor, the windings of the stator 1 are constituted by a main winding and an auxiliary winding; and lead wires 7 are connected to the main winding and the auxiliary winding. The lead wires 7 are connected to a power source, and power is supplied to the main winding and the auxiliary winding. In the stator 1 of a single-phase induction motor, three lead wires 7 in total are used: two lead wires 7 that are connected to a coil terminal, and one lead wire 7 that is connected to a protector (described later). These three lead wires 7 are gathered in a lead-wire outlet part 8 provided in a lead-wire outlet component and are assembled to the stator core 3.

The lead-wire outlet component is provided at an end face (near the end-face insulating plate 2) of the stator core 3 in an axial direction, and it is formed by molding a thermoplastic resin such as PBT. Further, the lead-wire outlet component includes the lead-wire outlet part 8 and a capacitor-assembly-box attachment unit 33 (hereinafter, "box attachment unit").

The wedges 10 are used so that, when coils are inserted in the stator core 3, the coils do not stick out from a slot opening 12 of the stator core 3 on the inner diameter side and so that coils and tip end parts (the inner diameter side) of teeth 11 are insulated from each other. Binding threads 4 are wound around an outer periphery side of the stator core 3, an outer side of respective coil end parts 9, and an inner diameter side of the teeth 11.

A protector that protects the motor 100 (e.g., by blocking a current when the temperature of the coils becomes equal to or higher than a predetermined temperature) is incorporated in a protector protection component 5. The protector protection component 5 is bound to the outside of any one of two coil end parts 9 using the binding threads 4.

In FIG. 4, the molded stator 30 can be obtained by mold-forming the stator 1 with thermoset molding resin. The box attachment unit 33 is formed on an outer periphery part of the molded stator 30; and the lead-wire outlet part 8 protrudes from the outer diameter face of the box attachment unit 33. Because the tip end part of the lead-wire outlet part 8 protrudes from the box attachment unit 33, the lead wire 7 wired on the outside in a radial direction from the lead-wire outlet part 8 protrudes outside from the molded stator 30.

In FIG. 3, the box attachment unit 33 includes pilot holes 34 for screws 82 (such as tapping screws: see FIG. 2) that fix the capacitor assembly box 80 to the molded stator 30. Two pilot holes 34, for example, are provided to protrude to a face of the outside of the box attachment unit 33 in a radial direction. By providing these pilot holes 34, the capacitor assembly box 80 can be assembled to the molded stator 30 by using the screws 82. Therefore, in the motor 100 according to the present embodiment and in a way that is different from conventional techniques, it is not necessary to manufacture a different component for assembling the capacitor assembly box 80 to the molded stator 30. Accordingly, when compared to conventional techniques, component costs can be reduced.

In FIGS. 2 and 4, on the outer periphery part of the molded stator 30, a foot-plate attachment unit 32 is formed on a part opposite to the box attachment unit 33. When the stator 1 is formed by mold-forming, the foot-plate attachment unit 32 is formed integrally with a foot-plate attachment component 20 using thermoplastic resin such as PBT. Foot-plate installing faces 24 of a plurality of screw fastening parts 25 (see FIG. 1) constitute the foot-plate attachment component 20 and each screw fastening part 25 protrudes from the foot-plate attachment unit 32.

The foot-plate attachment component 20 illustrated in FIG. 1 is constituted by connecting a plurality (for example, three) of screw fastening parts 25 to a thin plate part 22, each of the screw fastening parts 25 being formed in a cylindrical shape that diametrically expands from the foot-plate installing faces 24 towards a stator installing face 26. The reason for the screw fastening parts 25 being formed in such a shape is to prevent the screw fastening parts 25 from falling off from the outside of the stator 1 in a radial direction after the foot-plate attachment component 20 is formed by mold-forming with the stator 1. On an outer periphery face of each of the screw fastening parts 25, a plurality of projections 23 are formed. The projections 23 are provided to prevent the screw fastening parts 25 from rotating when screws 64 (such as tapping screws) for fixing the foot plate 60 to the molded stator 30 are fastened. Pilot holes 21 into which the screws 64 are inserted are formed on the foot-plate installing faces 24 of the respective screw fastening parts 25. The stator installing face 26 is formed in a curved manner to meet the outer periphery face of the stator core 3.

As described above, because the foot-plate attachment component 20 is constituted such that the respective screw fastening parts 25 are connected to one another with the thin plate part 22, the respective screw fastening parts 25 do not need to be set in a die separately, and thus processing costs can be reduced. Changing of the type and the attaching position of the foot-plate attachment component 20 can be made by designing the attaching part of the foot-plate attachment component 20 in a die.

The stator 1 and the foot-plate attachment component 20 are integrally formed from a thermoset resin in a state where the stator 1 and the foot-plate attachment component 20 are set in a predetermined position in a die. Positioning of the stator 1 in an axial direction is performed by matching the inner diameter of the stator 1 with a center shaft of a molded-stator molding die; and causing a die pressing part of the end-face insulating plate 2 of the stator 1 to be pressed on the molded-stator molding die. The die pressing part of the end-face insulating plate 2 protrudes to an external part (outside in an axial direction) of the molded stator 30. When the stator 1 is formed by mold-forming, because the stator 1 is formed by pressing the foot-plate attachment component 20 to an outer periphery face of the stator 1, ingress of mold resin into the screw fastening parts 25 from a gap between the stator installing face 26 and the stator core 3 can be reduced. Because of this, it is possible to prevent mold resin from leaking to the foot-plate installing faces 24, and thus quality improvement of the molded stator 30 can be achieved.

In FIG. 2, the rotor assembly 70 includes a rotor 75, a shaft 74, two bearings 72 and 73, and a bearing cover 71. The rotor assembly 70 is assembled to the molded stator 30 after a spring washer 40 is assembled to the molded stator 30 from a reverse side of the fan cover 50 of the molded stator 30. Subsequently, the bracket 90 is assembled to the molded stator 30 having the rotor assembly 70 assembled thereto and it is on the reverse side of the fan cover 50 of the molded stator 30.

A plurality of leg parts 35 are provided on an outer periphery face of the molded stator 30. Each of the leg parts 35 is provided to extend in a radial direction at a vicinity of an end part of the reverse side of the fan cover 50 of the molded stator 30. Further, in the bracket 90, on an end face on a side of the molded stator 30, a plurality of leg parts 91 are formed, each of the leg parts 91 extending outside of the bracket 90 in a radial direction. In each of the leg parts 91, a hole penetrating in an axial direction is formed, and a hole 31 (see FIG. 4) penetrating in an axial direction is also formed in each of the leg parts 35. Because of this configuration, by inserting a screw (not illustrated), which has been inserted into and through the hole of the respective leg parts 91, into the hole 31 of the respective leg parts 35, the bracket 90 assembled to the molded stator 30 is fixed.

A fringer 43 is fitted into the shaft 74 so as to approach the bracket 90 when, for example, the motor 100 is used for a pump, such that it prevents foreign objects from being accumulated near a gap between the shaft 74 and the bracket 90.

The cooling fan 41 that cools the motor 100 is formed by molding a thermoplastic resin such as PA (polyamide). The cooling fan 41 is constituted by a disk-shaped thin plate part 41*b* and a plurality of blades 41*a*, each provided on a reverse side of the molded stator 30 of the thin plate part 41*b*. The cooling fan 41 is assembled to the shaft 74 of the rotor assembly 70 assembled to the molded stator 30, i.e., the shaft 74 projecting to outside of the molded stator 30. Subsequently, a C-ring 42 is assembled to the shaft 74. Because of this configuration, it is possible to prevent the blades 41*a* of the cooling fan 41 from coming into contact the fan cover 50.

The fan cover 50 assembled to the molded stator 30 is provided to protect the cooling fan 41. The fan cover 50 is formed in a thin dome shape (a mortar shape), for example, with thermoplastic resin such as PA (polyamide), and is provided in the molded stator 30 so that an opening part 54 (a part opposite to an air intake 52: see FIG. 5) of the fan cover 50 covers the cooling fan 41. The air intake 52, provided in a position facing the blades 41*a*, is provided in the fan cover 50. The box attachment unit 33 described above is provided near the opening part 54 of the fan cover 50 on the outer periphery part of the molded stator 30, and it is formed in a planar shape.

Furthermore, a plurality of fan-cover fixing leg parts 55 corresponding to the shape of the fan-cover fixing parts 38 (see FIG. 4) of the molded stator 30 are formed on the fan cover 50. Projections 56 are formed in the respective leg parts 55 and they correspond to positions of the holes 37 (see FIG. 4) for fan-cover fixing and for press-fitting thereinto. As the projections 56 are press-fitted into the holes 37, the fan cover 50 is fixed to the molded stator 30.

The foot plate 60 is a plate used for installing, for example, the motor 100 in a tank of a pump and is formed by press-molding sheet metal. A hole 61 (see FIG. 2) corresponding to a pilot hole (not illustrated) that protrudes from the foot-plate attachment unit 32 of the molded stator 30 and a hole 62 (see FIG. 5) for fixing the motor 100 are formed in the foot plate 60. By inserting each of the screws 64 (see FIG. 2) in the hole 61 and inserting the screw 64 (see FIG. 2) into a hole of the foot-plate attachment component 20, the foot plate 60 is fixed to the molded stator 30.

When the stator core 3 is to be grounded as illustrated in FIG. 2, the screws 64 to which a grounding wire 66 is assembled are made to have a length such that the tip ends of the screws 64 come into contact with the stator core 3 when the foot plate 60 is fastened by the screws 64. Because of this configuration, the stator core 3 can be grounded without using a separate component to provide grounding, and thus component costs can be reduced.

The capacitor assembly box 80 is formed by molding a thermoplastic resin such as PP (polypropylene). In the capacitor assembly box 80, a plurality of holes (not illustrated) corresponding to the pilot holes 34 that protrude from the box attachment unit 33 of the molded stator 30 are formed. By inserting the screws 82 in these holes and inserting the screws 82 into the pilot holes 34 of the box attachment unit 33, the molded stator 30 is fixed to the capacitor assembly box 80.

Inside the capacitor assembly box 80 that is installed in the molded stator 30, the lead wires 7 are led out from the lead-wire outlet part 8; and the lead wires 7 having been led out from inside the capacitor assembly box 80 are connected to the capacitor 81 that is assembled to the capacitor assembly box 80.

An operation of the motor 100 is described below. When the motor 100 is operated, the cooling fan 41 assembled to the shaft 74 is rotated in cooperation with the rotor 75. Due to the rotation of the cooling fan 41, air is drawn in from the air intake 52; and as the air drawn in from the air intake 52 flows over the outer periphery face of the molded stator 30, the molded stator 30 is cooled.

Manufacturing steps of the motor 100 are described next.

(1) Step 1: First, the stator 1, the rotor assembly 70, the bracket 90, the foot plate 60, the cooling fan 41, the fan cover 50, the capacitor assembly box 80, and the grounding wire 66 are manufactured.

(2) Step 2: The molded stator 30 is manufactured by mold-forming of the manufactured stator 1 and the foot-plate attachment component 20.

(3) Step 3: One of the pilot holes 21 provided in the foot-plate attachment component 20 is drilled out until it reaches the stator core 3. Concurrently, the rotor assembly 70 and the bracket 90 are manufactured.

(4) Step 4: Next, in the following order, the spring washer 40, the rotor assembly 70, the bracket 90, and a screw 93 are assembled to the molded stator 30. Concurrently, molding of a cooling fan is performed.

(5) Step 5: The cooling fan 41 is assembled to the molded stator 30, and the shaft 74 projecting from the molded stator 30 is assembled to the C-ring 42. Concurrently, molding of the fan cover 50, molding of the capacitor assembly box 80, manufacturing of the foot plate 60, and manufacturing of the grounding wire 66 are performed.

(6) Step 6: The foot plate 60 and the capacitor assembly box 80 are assembled to the molded stator 30, and the grounding wire 66 is attached by the screws 64 at the same time.

(7) Step 7: By press-fitting the leg parts 55 formed on the fan cover 50 into the holes 37 for fan-cover fixing, which protrude from the fan-cover fixing part 38, the fan cover 50 is fixed.

(8) Step 8: Finally, by connecting the lead wires 7 led out from inside the capacitor assembly box 80 to the capacitor 81, the motor 100 is completed.

Because of the manufacturing steps described above, the motor 100 including the cooling fan 41 can be manufactured efficiently. The motor 100 according to the present embodiment is used, for example, as a drive unit of a domestic pump, and by using the motor 100, reduction of component costs and processing costs for the pump can be achieved.

While the present embodiment has described a configuration example in which the holes 37 for fan-cover fixing are provided on an end face of the end-face insulating plate 2, instead of providing the holes 37 for fan-cover fixing on an end face of the end-face insulating plate 2, it is also possible to configure the present embodiment such that dents corresponding to these holes 37 are formed in the fan-cover fixing part 38 after mold-forming and that the projections 56 of the fan cover 50 are press-fitted into the dents.

As described above, the motor 100 according to the first embodiment of the present invention includes the molded stator 30, the cooling fan 41 assembled to an end part of a rotor shaft (the shaft 74), the fan cover 50, the capacitor assembly box 80, the foot plate 60, and the bracket 90. On the end face of the molded stator 30 in the axial direction, a plurality of the holes 37, each protruding from the end face, are formed, and a plurality of projections 56, the projections 56 formed in positions opposite to the holes 37 and press-fitted into the holes 37, are provided in the fan cover 50. While it has been necessary to provide a separate component for assembling a fan cover to a molded stator when using conventional techniques, with the motor 100 according to the present embodiment, the projections 56 of the fan cover 50 are press-fitted in the holes 37 of the molded stator 30, and the fan cover 50 is fixed to the molded stator 30. Therefore, unlike when using conventional techniques, it is not necessary to provide a different separate component for assembling the fan cover 50 to the molded stator 30, and the work of assembling the different component to the molded stator 30 can be omitted. As a result, it is possible to avoid the manufacturing costs of such a separate component and to simplify the assembling steps of the motor, and thus further cost reduction when compared with using conventional techniques can be achieved and the number of manufacturing components can be reduced.

The end-face insulating plate 2 is formed on both end faces of the stator core 3 in an axial direction; and cylindrical bodies that function as the holes 37 are formed in the end-face insulating plate 2. By providing the cylindrical bodies, holes in which the projections 56 of the fan cover 50 are inserted can be formed when mold-forming. Therefore, the assembling step of the motor 100 can be further simplified, and cost reduction of the motor 100 can be achieved.

The foot-plate attachment unit 32 that attaches the foot plate 60 to the molded stator 30 is formed in the molded stator 30 according to the first embodiment of the present invention, and a plurality of pilot holes 21 for screw fastening therein are formed in the foot-plate attachment unit 32 so as to protrude from the outer periphery face of the molded stator 30. Because of this configuration, the foot plate 60 can be firmly assembled to the molded stator 30, and the quality of the motor 100 can be improved.

The molded stator 30 according to the first embodiment of the present invention includes the foot-plate attachment component 20 that is constituted by connecting the plurality of screw fastening parts 25 including the pilot holes 21 for screw fastening with the thin plate part 22; and the pilot holes 21 that are provided to protrude from the outer periphery face of the molded stator 30. Because of this configuration, screw fastening parts 25 of the plurality of screw fastening parts 25 do not need to be set in a die individually, and the foot plate 60 can be firmly assembled to the molded stator 30. As a result, reduction of processing costs and improvement of the quality of the motor 100 can be achieved.

The box attachment unit 33 that attaches the capacitor assembly box 80 to the molded stator 30 is formed in the molded stator 30 according to the first embodiment of the present invention. In the box attachment unit 33, a plurality of pilot holes 34 for screw fastening are formed so as each of the pilot hole 34 protrudes from the outer periphery face of the molded stator 30, and the lead-wire outlet part 8 is also formed. Because of this configuration, it is not necessary to manufacture a different component for fixing the capacitor assembly box 80 to the molded stator 30, and thus component costs can be reduced.

Second Embodiment

Figure 7:
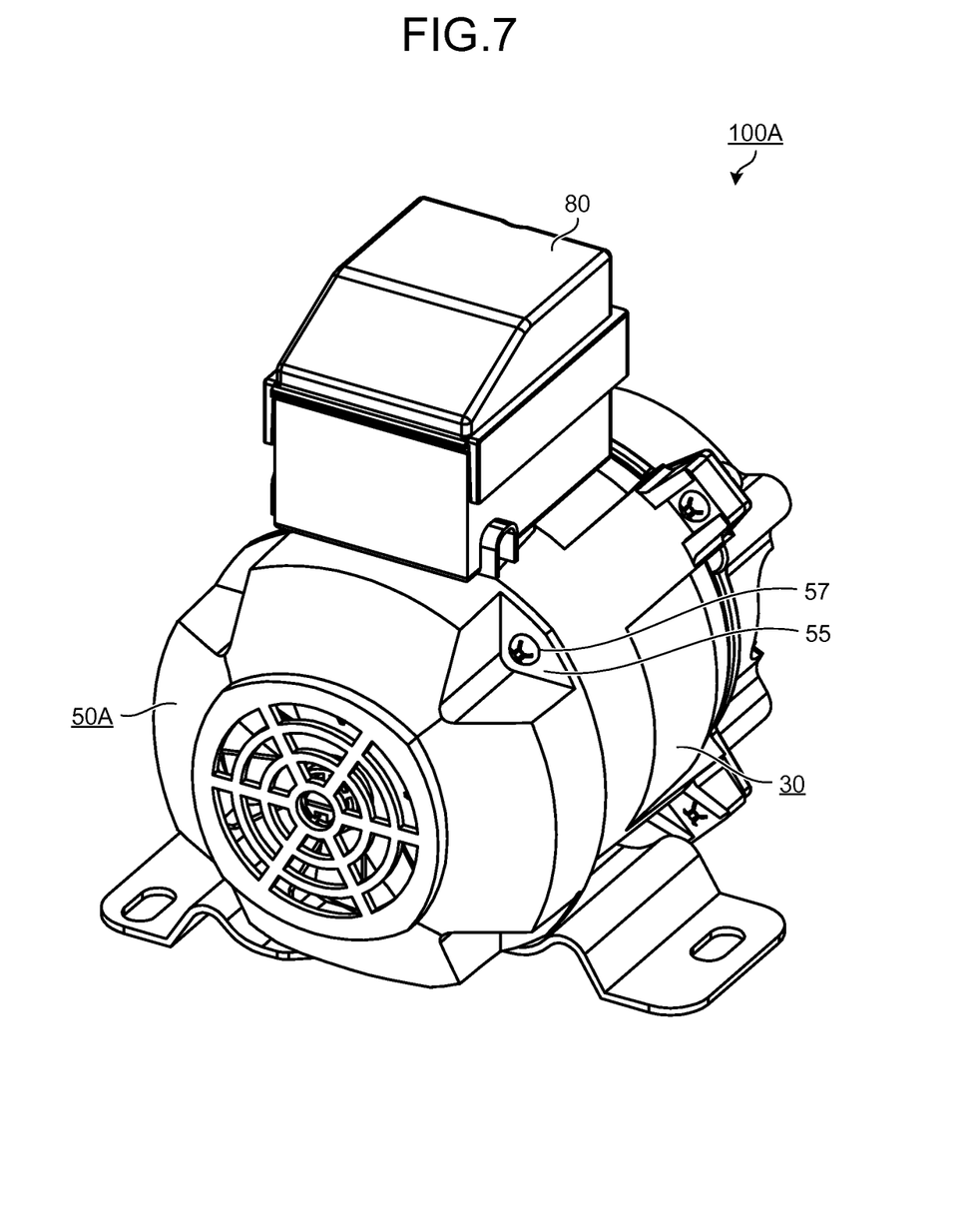
FIG. 7 is a perspective view illustrating a motor according to a second embodiment of the present invention.

FIG. 7 is a perspective view illustrating a rotary machine 100A according to a second embodiment of the present invention. The difference between the second embodiment and the first embodiment is that the second embodiment has a configuration such that, in the leg parts 55 of the fan cover 50, fan-cover fixing holes corresponding to the holes 37 (see FIG. 4) are provided instead of the projections 56 (see FIG. 5), and tapping screws 57 are inserted into these holes and the tapping screws 57 are also inserted into the holes 37 of the molded stator 30.

In this manner, in the motor 100A according to the second embodiment of the present invention, a plurality of the holes 37 are formed on an end face of the molded stator 30 in an axial direction, and the tapping screws 57 are screwed into the holes 37 in the axial direction via a fan cover 50A. Because of this configuration, effects identical to those of the first embodiment can be obtained; and because it is not necessary to provide the projections 56 of the fan cover 50 as in the first embodiment, further cost reduction of the motor 100A can be achieved.

Third Embodiment

Figure 8:
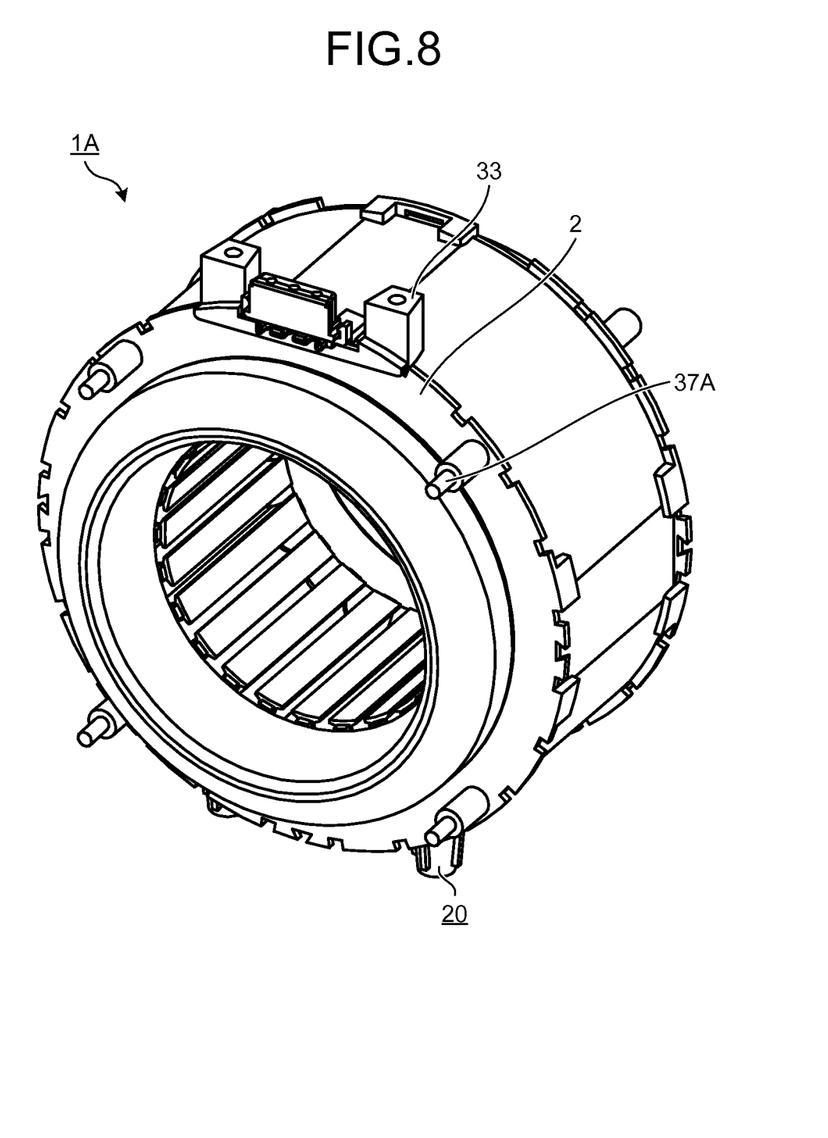
FIG. 8 is a perspective view illustrating a stator according to a third embodiment of the present invention.
Figure 9:
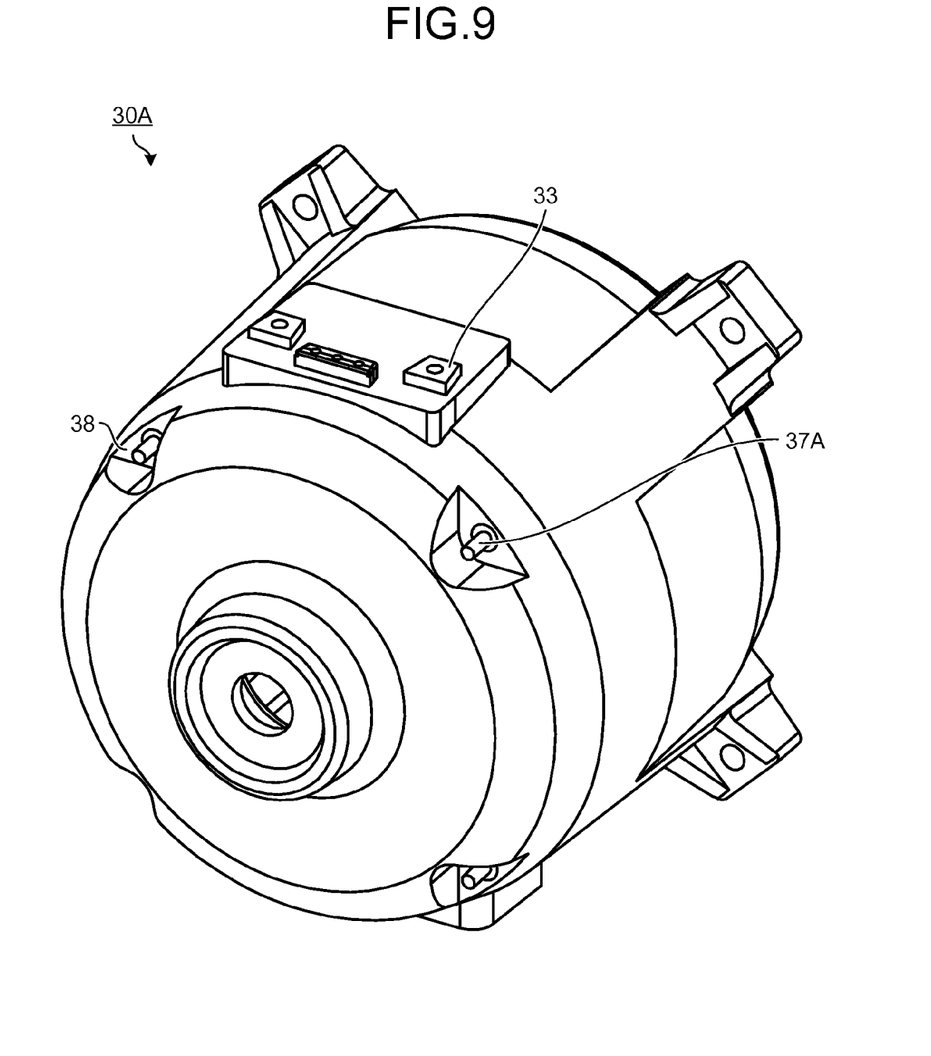
FIG. 9 is a perspective view illustrating a molded stator according to the third embodiment of the present invention.
Figure 10:
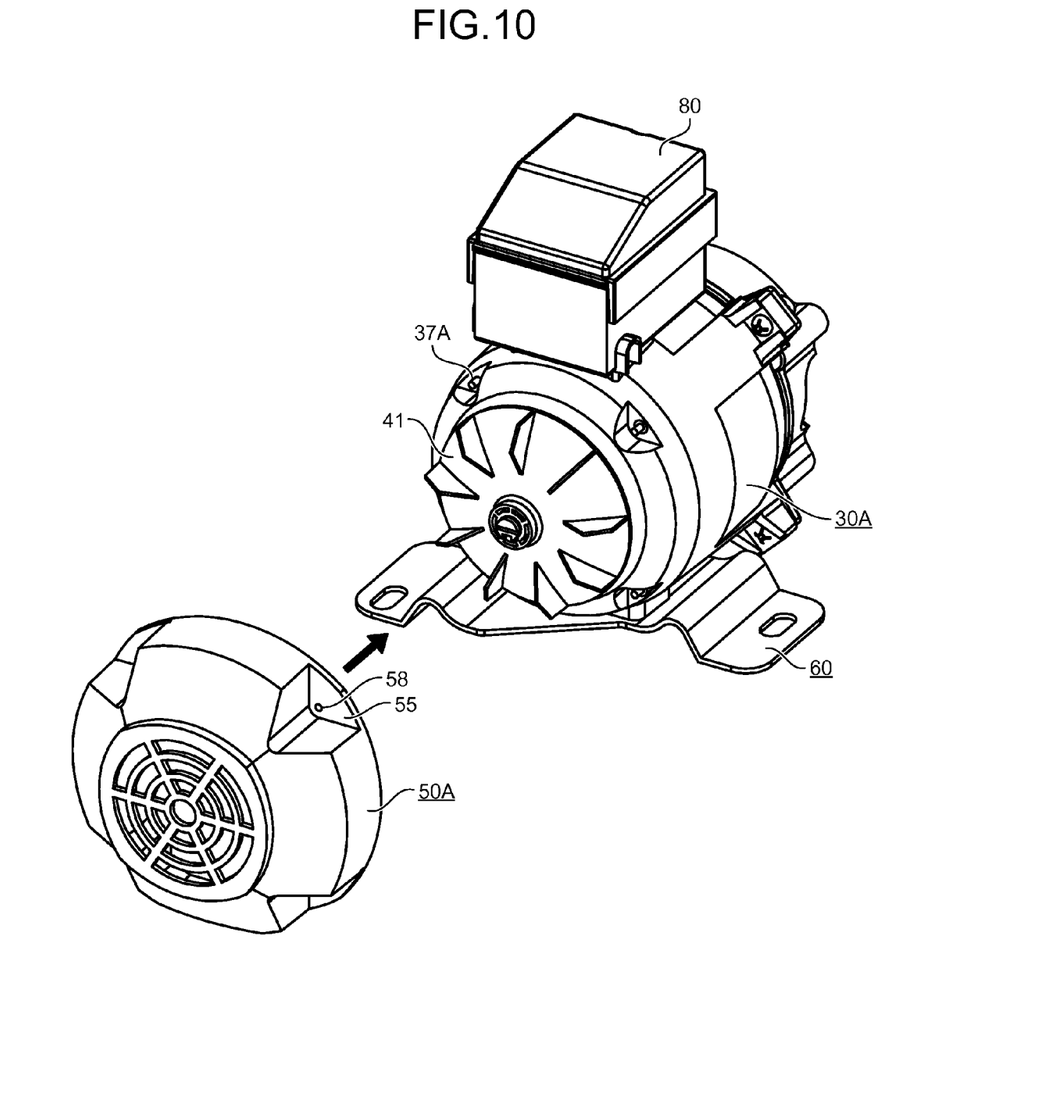
FIG. 10 is a diagram illustrating a state where a fan cover is to be attached to the molded stator illustrated in FIG. 9.
Figure 11:
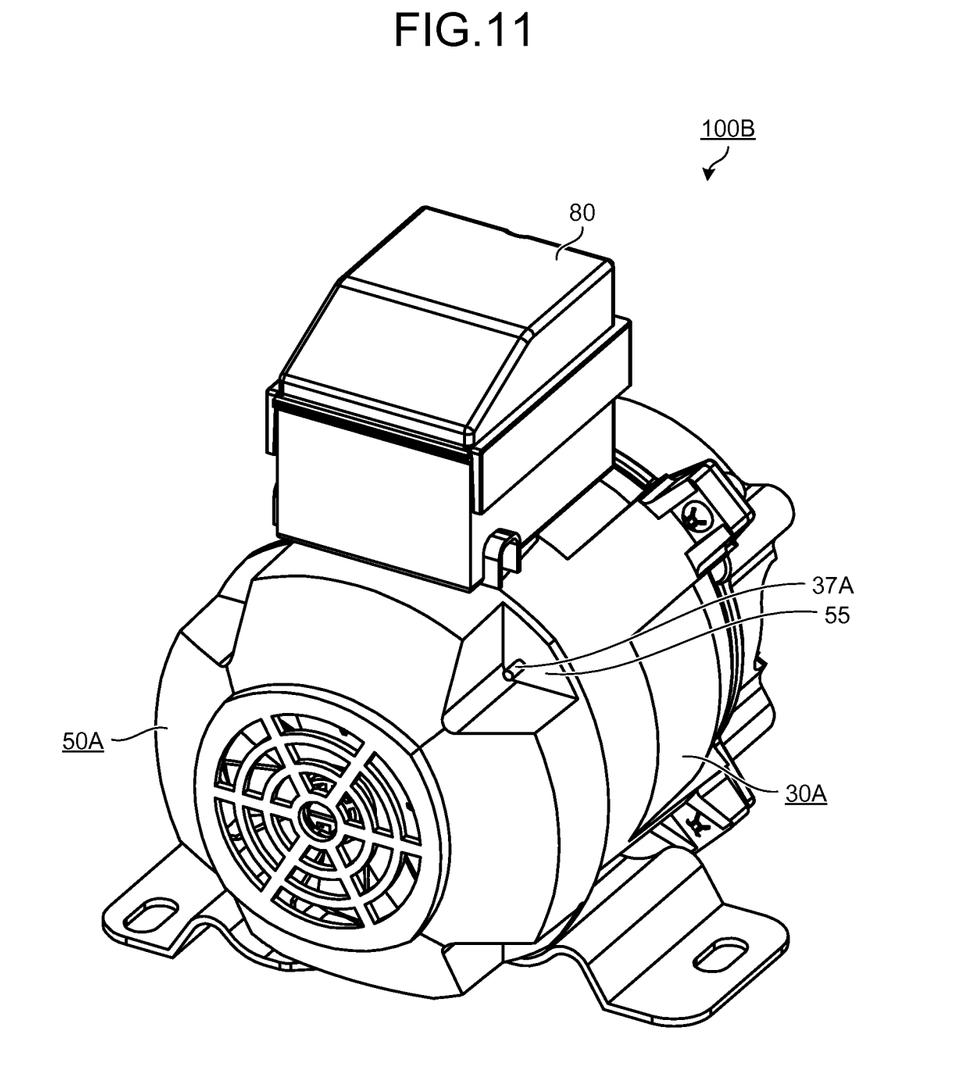
FIG. 11 is a diagram illustrating a motor having the fan cover attached thereto.

FIG. 8 is a perspective view illustrating a stator according to a third embodiment of the present invention. FIG. 9 is a perspective view illustrating a molded stator according to the third embodiment of the present invention. FIG. 10 is a diagram illustrating a state where a fan cover is to be attached to the molded stator illustrated in FIG. 9. FIG. 11 is a diagram illustrating a motor having the fan cover attached thereto.

In a motor 100B according to the third embodiment, a molded stator 30A and the fan cover 50A are used instead of the molded stator 30 and the fan cover 50 according to the first embodiment.

In FIG. 8, a plurality of fan-cover fixing projections 37A are formed on an end face of the end-face insulating plate 2. As illustrated in FIG. 9, when a stator 1A is formed by mold-forming, the projections 37A protrude from a surface of the fan-cover fixing part 38 in an axial direction of the molded stator 30A.

In FIG. 10, similar to the first embodiment, a plurality of leg parts 55 are formed on the fan cover 50A. Holes 58 corresponding to positions of the projections 37A and through which these projections 37A are inserted are respectively formed in the leg parts 55. When the projections 37A are inserted through the holes 58, tip ends of the projections 37A protrude from a surface of the fan-cover fixing part 38 in the axial direction of the molded stator 30A (see FIG. 11). Furthermore, the fan cover 50A is fixed to the molded stator 30A by thermally welding the projections 37A.

Thus, in the motor 100B according to the third embodiment of the present invention, a plurality of the projections 37A are formed on an end face of the molded stator 30A in an axial direction; the holes 58 formed at positions opposite to the projections 37A are formed in the fan cover 50A; and the projections 37A having penetrated through the holes 58 are thermally welded. Because of this configuration, effects identical to those of the first embodiment can be obtained.

As described above, in the motor according to the first to third embodiments of the present invention, there is provided a fixing structure, which is provided in an opposing part to an end face of the molded stator (30 or 30A) in an axial direction and to the fan cover (50 or 50A), that is constituted by a plurality of the holes (the holes 37 according to the first and second embodiments or the holes 58 according to the third embodiment) and a plurality of the insertion members (the projections 56 according to the first embodiment, the tapping screws 57 according to the second embodiment, or the projections 37A according to the third embodiment). And the fixing structure fixes the fan cover (50 or 50A) to the molded stator (30 or 30A). Because of this configuration and in a way that is different from the conventional techniques, it is not necessary to use a different component, and thus it is possible to meet the needs to achieve further cost reduction.

Furthermore, the motor according to the first to third embodiments is used as a drive unit of a domestic pump; and by using the motor, reduction of component costs and manufacturing costs of the pump can be achieved.

Further, the method for manufacturing a motor according to the embodiments of the present invention includes a step of manufacturing a molded stator by mold-forming a stator; a step of assembling a rotor assembly, a bracket, a foot plate, and a capacitor assembly box to the molded stator; and a step of manufacturing a motor, in which a fixing structure provided in an opposing part to an end face of the molded stator in an axial direction and to the fan cover, and which is constituted by a plurality of holes and a plurality of insertion members to be inserted in these holes. The fixing structure fixes the fan cover to the molded stator, and the fan cover is assembled to the molded stator by the fixing structure. Therefore, it is possible to efficiently manufacture a motor that requires a lower cost than that associated with conventional techniques.

The motor according to the embodiments of the present invention is only an example of the present invention. The present invention can be combined with other well-known techniques, and it is not necessary to mention that the present invention can be configured while modifying it without departing from the scope of the invention, such as omitting a part of its configuration.

INDUSTRIAL APPLICABILITY

As described above, the present invention is applicable to a motor and a pump, and it is particularly useful as an invention that can achieve further quality improvement.

The invention claimed is:

1. A motor comprising:
a molded stator including
    a rotor that is rotatably provided therein and
    a stator formed by molding with a thermoset resin;
a cooling fan assembled to the molded stator;
a fan cover covering the cooling fan; and
a fixing structure, wherein
    the fixing structure includes a combination of
        a plurality of cylindrical bodies that are provided at the stator and that have holes therein parallel to an axial direction of the rotor, the holes opposing the fan cover and
        a plurality of insertion members that are provided at the fan cover, the insertion members opposing an end face of the molded stator and being inserted into the holes provided at the cylindrical bodies, and
    the fixing structure fixes the fan cover to the molded stator, and
each of the insertion members
    is formed on the fan cover at a position opposite to the respective holes of the cylindrical bodies and
    is a projection to be press-fitted into the respective holes of the cylindrical bodies.

2. The motor according to claim 1, wherein
in the stator, an end-face insulating plate is formed on both end faces in the axial direction thereof, and
cylindrical bodies are formed on the end-face insulating plate.

3. The motor according to claim 1, further comprising
a foot plate; and
a foot-plate attachment unit provided at the molded stator,
    the foot-plate attachment unit attaches the foot plate to the molded stator for installation of the motor, and
    a plurality of pilot holes for screw fastening are formed in the foot-plate attachment unit so as to protrude from an outer periphery face of the molded stator.

4. The motor according to claim 1, wherein
the molded stator includes a foot-plate attachment component that is constituted by connecting a plurality of screw fastening parts including pilot holes for screw fastening to a thin plate part, and
the pilot holes are provided so as to protrude from an outer periphery face of the molded stator.

5. The motor according to claim 1, wherein
a capacitor-assembly-box attachment unit, formed in the molded stator, attaches a capacitor assembly box which incorporates the capacitor therein, and
in the capacitor-assembly-box attachment unit, in addition to a plurality of pilot holes for screw fastening that are formed so as to protrude from an outer periphery face of the molded stator, a lead-wire outlet part is formed.

6. A pump having the motor according to claim 1 incorporated therein.

7. A method for manufacturing a motor comprising:
manufacturing a thermoset resin molded stator including a plurality of cylindrical bodies by mold-forming the stator;
assembling a rotor assembly, a bracket, a foot plate, and a capacitor assembly box to the molded stator;

providing a fan cover that opposes an end face of the molded stator in an axial direction, and that includes a plurality of insertion members formed on the fan cover configured for insertion into the cylindrical bodies of the molded stator to fix the fan cover to the molded stator, and assembling the fan cover to the molded stator by inserting the insertion members in a press-fitted manner into the cylindrical bodies.

8. A method for manufacturing a motor comprising:

manufacturing a molded stator, which includes an end face with a plurality of axially oriented projections, by mold-forming the stator;

assembling a rotor assembly, a bracket, a foot plate, and a capacitor assembly box to the molded stator;

providing a fan cover that opposes the end face of the molded stator in an axial direction, and that includes a plurality of holes configured to receive the projections of the molded stator when the projections are inserted into the holes; and assembling the fan cover to the molded stator by heat-molding each of the projections into the respective holes.

\* \* \* \* \*